(12) United States Patent
Cihla et al.

(10) Patent No.: US 7,359,758 B2
(45) Date of Patent: Apr. 15, 2008

(54) METHODS, SYSTEMS, AND COMPUTER PROGRAM PRODUCTS FOR IMPLEMENTING A REUSABLE NEW PRODUCT PLANNING MODEL

(75) Inventors: Jennifer D. Cihla, Petaluma, CA (US); John M. Konopka, Tempe, AZ (US); Sarah E. Santo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 11/308,395

(22) Filed: Mar. 21, 2006

(65) Prior Publication Data

US 2007/0225844 A1 Sep. 27, 2007

(51) Int. Cl.
*G06F 19/00* (2006.01)
(52) U.S. Cl. .......................... 700/97; 705/10
(58) Field of Classification Search ............. 700/95, 700/97–98, 100–103; 705/10
See application file for complete search history.

(56) References Cited

U.S. PATENT DOCUMENTS 5,712,985 A * 1/1998 Lee et al. .................. 705/7
2003/0149578 A1 8/2003 Wong
2004/0068454 A1 4/2004 Jacobus et al.
2004/0153187 A1* 8/2004 Knight et al. ............... 700/99
2005/0060242 A1 3/2005 Armstrong et al.
2006/0111963 A1* 5/2006 Li et al. ...................... 705/10

* cited by examiner

*Primary Examiner*—Zoila Cabrera
(74) *Attorney, Agent, or Firm*—Cantor Colburn LLP; Lisa Jaklitsch

(57) ABSTRACT

A method, system, and computer program product for implementing a reusable new product planning model is provided. The method includes gathering historical demand data for products in a product set and determining a launch period for the products, the historical demand data broken down by time periods. For each of the time periods, the method includes determining a transition percentage for each of the products, grouping the transition percentages by respective launch-based time periods, and averaging the transition percentages, resulting in an averaged transition range. The method further includes calculating fast and slow transition ranges for each of the launch-based time periods. The method further includes developing a production plan for a new product by applying one of the transition ranges to the new product before product launch, and allocating a remaining demand percentage to existing products in the product set using the selected transition range and for a corresponding launch-based time period.

14 Claims, 5 Drawing Sheets

Historical demand data

| | Period 0 | Period 1 | Period 2 | Period 3 | Period 4 |
|---|---|---|---|---|---|
| Total Units | 1000 | 1100 | 1210 | 1300 | 1430 |

FIG. 3A

Units By Product Set

| | Period 0 | Period 1 | Period 2 | Period 3 | Period 4 |
|---|---|---|---|---|---|
| Product A | 1000 | 550 | 121 | - | - |
| Product B | - | 330 | 424 | 195 | - |
| Product C | - | 220 | 424 | 130 | - |
| Product D | - | - | 242 | 585 | 644 |
| Product E | - | - | - | 390 | 787 |

FIG. 3B

Transition %

| | Period 0 | Period 1 | Period 2 | Period 3 | Period 4 |
|---|---|---|---|---|---|
| Product A | 100% | 50% | 10% | 0% | 0% |
| Product B | | 30% | 35% | 15% | 0% |
| Product C | | 20% | 35% | 10% | 0% |
| Product D | | | 20% | 45% | 45% |
| Product E | | | | 30% | 55% |

FIG. 3C

Determining the Average, Fast, and Slow Transition Ranges

|  | GA | GA+1 | GA+2 |
|---|---|---|---|
| Product B/C | 50% | 70% | 25% |
| Product D | 20% | 45% | 45% |
| Product E | 30% | 55% | 35% |
| Average | 33% | 57% | 35% |
| High (Fast) | 50% | 70% | 45% |
| Low (Slow) | 25% | 50% | 25% |

FIG. 3D

Determining the remainder of the product transition
For next period, Period 5

| Transition period | Product F | Product E | Products (E,D) | Product D |
|---|---|---|---|---|
|  | GA | GA+2 | mature | mature |
| Average | 33% | 35% | 43% | 32% |
| Fast | 50% | 45% | 30% | 5% |
| Slow | 25% | 25% | 50% | 50% |

For following period, Period 6

| Transition period | Product F | Product E | | Product D | |
|---|---|---|---|---|---|
|  | GA+1 | % of mature | % of Total | % of mature | % of Total |
| Average | 57% | 53% | 23% | 48% | 21% |
| Fast | 70% | 90% | 27% | 10% | 3% |
| Slow | 50% | 33% | 17% | 67% | 33% |

FIG. 3E

Demand Forecast

| | Period 5 | Period 6 |
|---|---|---|
| Total Units | 1600 | 1760 |

Forecast - Period 5

| | Product F | Product E | Product D |
|---|---|---|---|
| Average | 533 | 560 | 507 |
| Fast | 800 | 720 | 80 |
| Slow | 400 | 400 | 800 |

Forecast - Period 6

| | Product F | Product E | Product D |
|---|---|---|---|
| Average | 997 | 400 | 329 |
| Fast | 1232 | 475 | 48 |
| Slow | 880 | 293 | 533 |

FIG. 3F

METHODS, SYSTEMS, AND COMPUTER PROGRAM PRODUCTS FOR IMPLEMENTING A REUSABLE NEW PRODUCT PLANNING MODEL

BACKGROUND

The present invention relates generally to product planning and, more particularly, to methods, systems, and computer program products for implementing a reusable new product planning model.

Typically, demand for products of a similar type varies more at the product level than at the aggregate level. Therefore forecasting the demand for a complete set of products, e.g., mid-range servers, is easier than forecasting the demand for a single product within that product set. When a new product is introduced into the product set, forecasting demand for each individual product becomes even more difficult.

Planning techniques for predicting new product introduction volumes, the transition speed by which a new product replaces a series of related older products, and the associated end-of-life of volumes have been characterized by manual, disparate processes. Existing planning process can be based on trial and error, personal prognostications, or manual spreadsheet tools, to name a few. These processes are difficult to repeat and share across a corporation and generally have problematic results during new product introductions. Planners have not had a reusable method for predicting new product introduction effects on existing products; nor have they had techniques to view the total demand for the set of products and to determine how best to allocate the overall demand down to the product level.

Predicting the volumes for all products, new and old, in that period of introduction/transition is critical for the successful launch of a new product, and has implications on the extended supply chain. For the new product, ensuring supply, manufacturing, and distribution capacity matches market demand is crucial to capture market share and satisfy customer expectations. For the related products that are already in the market, the supply chain must make accommodations for slower growth or reduced levels of capacity to assure that capacity is not over-shot leading to obsolete inventory and write-offs.

What is needed, therefore, is a way to predict the demand of new products the associated effects on existing, related products in a product set in order to ensure greater accuracy in the production planning processes for these products.

BRIEF SUMMARY

In accordance with exemplary embodiments, a method, system, and storage medium for implementing a reusable new product planning model.

The method includes gathering historical demand data for products in a product set and determining a launch period for the products, the historical demand data broken down by time periods. For each of the time periods, the method includes determining a transition percentage for each of the products, grouping the transition percentages by respective launch-based time periods, and averaging the transition percentages, resulting in an averaged transition range. The method further includes calculating fast and slow transition ranges for each of the launch-based time periods. The method further includes developing a production plan for a new product by applying one of the transition ranges to the new product before product launch, and allocating a remaining demand percentage to existing products in the product set using the selected transition range and for a corresponding launch-based time period.

The system includes a processor in communication with a storage device. The storage device houses historical demand data for products in a product set. The system also includes a new product forecast application executing on the processor. The new product forecast application implements a method. The method includes gathering historical demand data for products in a product set and determining a launch period for the products, the historical demand data broken down by time periods. For each of the time periods, the method includes determining a transition percentage for each of the products, grouping the transition percentages by respective launch-based time periods, and averaging the transition percentages, resulting in an averaged transition range. The method further includes calculating fast and slow transition ranges for each of the launch-based time periods. The method further includes developing a production plan for a new product by applying one of the transition ranges to the new product before product launch, and allocating a remaining demand percentage to existing products in the product set using the selected transition range and for a corresponding launch-based time period.

The computer program product includes instructions for implementing a method. The method includes gathering historical demand data for products in a product set and determining a launch period for the products, the historical demand data broken down by time periods. For each of the time periods, the method includes determining a transition percentage for each of the products, grouping the transition percentages by respective launch-based time periods, and averaging the transition percentages, resulting in an averaged transition range. The method further includes calculating fast and slow transition ranges for each of the launch-based time periods. The method further includes developing a production plan for a new product by applying one of the transition ranges to the new product before product launch, and allocating a remaining demand percentage to existing products in the product set using the selected transition range and for a corresponding launch-based time period.

BRIEF DESCRIPTION OF THE DRAWING

Referring to the exemplary drawings wherein like elements are numbered alike in the several FIGURES:

FIGS. 3A-3F depict graphical representations of the output produced via the process described in FIG. 2, including a new product planning model, in accordance with exemplary embodiments.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

DETAILED DESCRIPTION OF THE INVENTION

In accordance with exemplary embodiments, a method, system, and computer program product for implementing a reusable new product planning model is provided. The new product planning model is created for products sets associated with a production planning system and/or a demand planning system that is then passed to a production planning system to explode down to the detail component and production scheduling level. The new product planning model enables the production planning system to utilize historical demand data for product sets, calculate transition percentages on aspects of the historical data, and group the averaged transition percentages into ranges that can be used in analyzing and predicting the affects of a new product's introduction on existing, related products within a product set. These, and other features of the reusable new product planning model will now be described.

Figure 1:
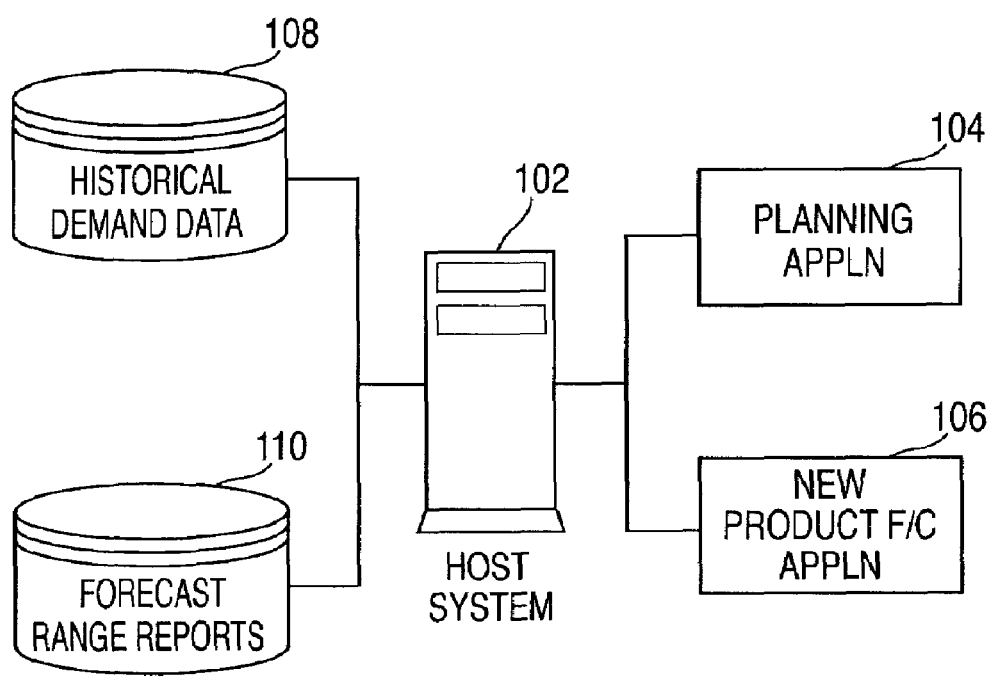
FIG. 1 is a block diagram upon which the new product planning model may be implemented in exemplary embodiments.

Turning now to FIG. 1, a system upon which the reusable new product planning model may be created and implemented will now be described in exemplary embodiments. The system of FIG. 1 includes a host system 102 executing one or more planning applications 104, as well as a new product forecast application 106. The host system 102 may be associated with a manufacturing enterprise that performs production planning processes. Host system 102 may comprise any type of processor device capable of handling the volume of production planning processes associated with the manufacturing enterprise. For example, if the manufacturing enterprise is a global manufacturing entity, the host system 102 may be implemented by one or more servers executing applications and various other business tools typically found in a manufacturing environment.

Planning application 104 may comprise a commercial or legacy-based planning software tool (e.g., advanced planning system (APS)) as dictated by the needs of the manufacturing enterprise. The new product forecast application 106 may include a user interface to assist individuals of the manufacturing enterprise to create and implement reusable new product models. Although the new product forecast application 106 is shown in FIG. 1 to be executing directly on the host system 102, it will be appreciated and understood by those skilled in the art that the application 106 may be executed by a remote processor (e.g., a general-purpose computer in communication with the host system via a network).

Host system 102 is in communication with one or more storage devices, such as storage device 108 and storage device 110. Storage device 108 stores historical demand data for product sets offered by the manufacturing enterprise of host system 102. A product set, as used herein, refers to a group of products having similar features and/or functions (e.g., mid-range servers). Thus, e.g., individual products in the product set may be distinguished by model type or other suitable distinction. Historical demand data may include volumes of products and/or product sets sold over a period of time (e.g., the product lifecycle), etc.

Storage device 112 stores forecast range reports generated by the new product forecast application 106 and are described further in FIG. 3. Host system 102 may be in direct communication with one or both of storage devices 110, 112 (e.g., via cabling or wireless local network technologies), or may be linked to one or both of storage devices 110, 112 via wide area network (WAN), Internet, or other type of network implementation.

Figure 2:
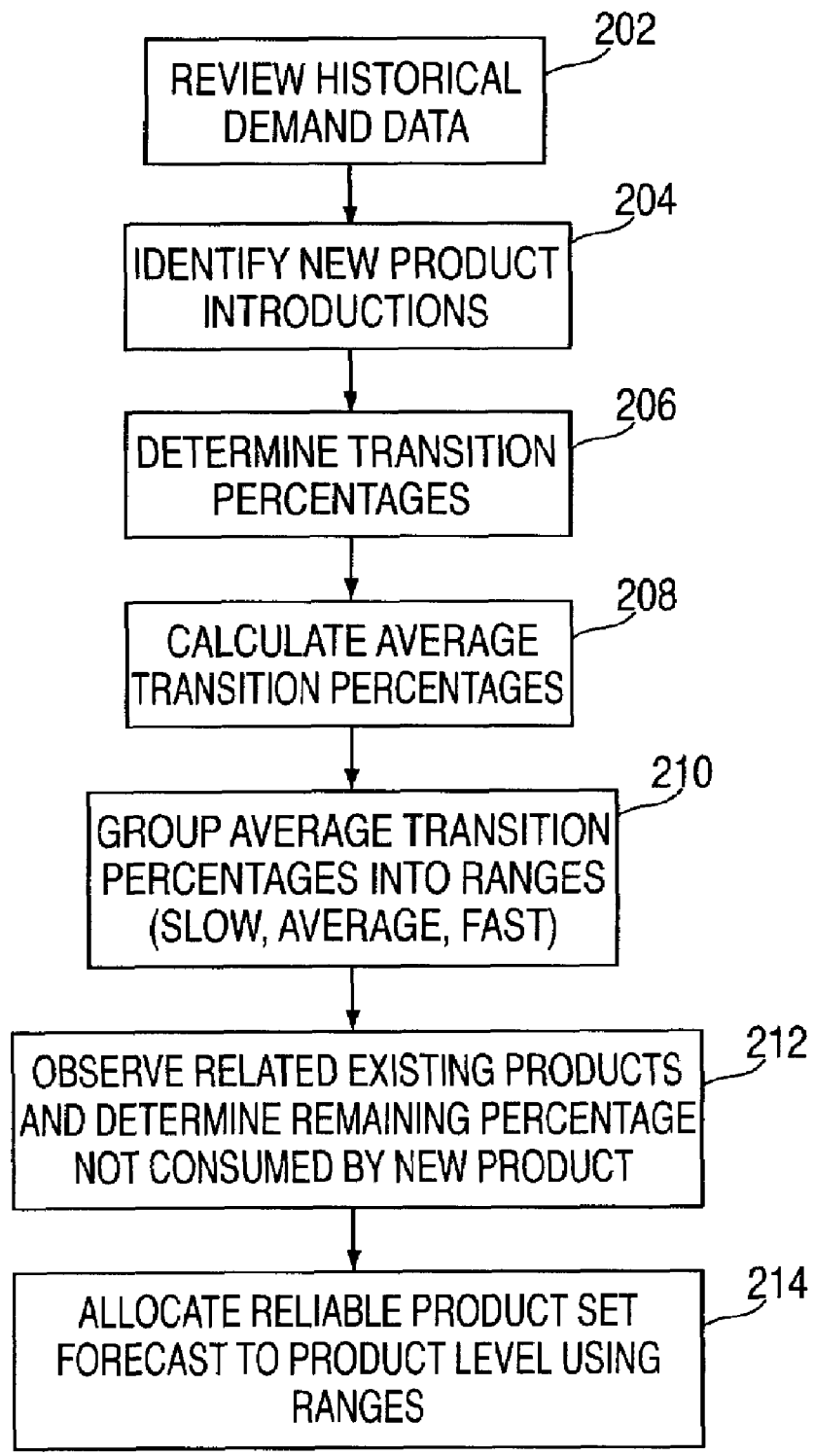
FIG. 2 is a flowchart illustrating a process for creating and implementing the new product planning model in accordance with exemplary embodiments.

As indicated above, a new product model may be created and reused over time for new products that are introduced. The new product model is well suited for new product introductions whereby the new product is in addition to, or a replacement of, related existing products in a product set. In addition, the features of the new product forecast application 106 may be utilized in conjunction with existing planning tools (e.g., planning application 104) via, e.g., an application programming interface (API). Turning now to FIGS. 2 and 3, a process for creating and implementing a reusable new product model, along with graphical representations of the output of the process will now be described in accordance with exemplary embodiments.

At step 202, the new product forecast application 106 initiates the development of a new product model for a product set by accessing storage device 108 and retrieving historical demand data for the group of products (i.e., product set) for a period of time (e.g., product lifecycle). FIG. 3A illustrates a total number of units identified (i.e., historical demand data) from step 202 over a period of time broken up into time segments (reflected in FIG. 3A as Periods 0-4). Periods 0 through 4, collectively, represent the historical product period being evaluated.

The historical demand data is evaluated in order to identify when each of the products in the set were introduced (i.e., new product introductions) at step 204. As shown in FIG. 3B, products A through E belong to a first product set. New production introductions for each product in the product set are identified. This introduction information may be referred to as the 'launch' dates or 'General Availability Dates' (GA) of the respective products. GA may be provided as a static table held within the historical demand database 108 and maintained by product planners. Alternatively, GA may be computed by the new product forecast application 106 based on when each product began shipping. In some cases, a new product may have a small number of shipments to test customers before the GA date. If this is the case, the new product forecast application 106 may be programmed such that the GA date is calculated after the product has reached a certain percentage of the total product set (e.g., new product demand is greater than 5% of the total product set's demand).

Continuing with the above example, assume that Product A was active before period 0 and through period 2. As shown in FIG. 3B, products B/C were introduced in period 1 and were active through period 3, Product D was launched in period 2 and is still active, and Product E was launched in period 3 and is also still active. Product F is the newest product that will be launched in period 5. The forecast is needed for all active products for periods 5 and 6.

Using the historical demand data (e.g., volumes associated with each product), the new product forecast application 106 calculates a transition percentage for each of the products A-E at step 206. A graphical representation of the transition percentages for products A-E is shown in FIG. 3C. The transition percentages are determined by calculating the volume of each product as a percentage of the total volume of the product set for each of the time periods. For example, Product D was introduced in Period 2 and reflects a demand for 242 units (FIG. 3B). The total volume for Period 2 (the sum of Products A-D) is 1211. Thus, the transition percentage for Product D in Period 2 is 20% (242 units divided by total units 1211). A transition percentage that is calculated for a product at a time period associated with the period of launch for that product is referred to as a new product transition percentage. For example, the new product transition percentage for Product D is 20% as shown in Period 2, the launch period for the product.

At step 208, the new product application 106 calculates the average transition percentages for each product. A graphical representation of the average transition percentages is shown in FIG. 3D. To calculate the average transition percentages, each new product transition percentage from FIG. 3C is normalized into time periods based on the GA period for that particular product, e.g., GA (Launch period), GA+1 (next period after launch), and GA+2 (second period after launch), as shown in FIG. 3D. These time periods are referred to herein as launch-based time periods in order to distinguish them from the time periods described in FIGS. 3A-3C. For time periods in which more than one new product has been launched, the new product transition percentages for each of the products are added together. As shown in FIG. 3D, the new product transition percentage for Products B/C is 50% (Period 1 corresponds to the GA period, or launch-based time period, for Products B/C and Product B's new product transition percentage of 30% is added to Product C's new product transition percentage of 20%). In addition, the number of launch-based time periods used to evaluate the product transition percentages will depend on the time periods being used for planning (daily, monthly, etc.) and the lifecycles for the type of product being planned.

Once each new product transition percentage from FIG. 3C is normalized into time periods based on the GA period (i.e., launch-based time periods) for that particular product, the average transition percentages are then calculated by launch-based time periods as a mathematical average. The average transition percentage is calculated by adding together the transition percentages for each of the products by their respective launch-based time periods and then averaging them. Using the sample data shown in FIG. 3D, the average transition percentage for Products B/C, D, and E is 33% for the launch-based time period GA. Likewise, the average transition percentage for Products B/C, D, and E is 57% for the launch-based time period GA+1. These average transition percentages reflect the overall affect each new product had on the product set.

Using the average transition percentages obtained from step 208, the new product forecast application 106 calculates ranges for Fast and Slow transitions for each of the launch-based time periods at step 210. Based on the average transition percentage, any products whose transition percentages are higher than the average, are then averaged and become the Fast transition range, in each launch-based time period. Any transition percentages that are lower than the average are averaged and become the Slow transition range. A graphical representation of the transition ranges for Products B/C, D, and E is shown in FIG. 3D. The ranges may be based on high and low averages to be sure to smooth out any extreme exceptions.

As indicated above, the fast range is determined by identifying those products whose transition percentages are greater than or equal to the average transition percentage (i.e., 33% for launch-based time period GA). As shown in FIG. 3D, there is only one item that meets this criterion, namely, Products B/C with a transition percentage of 50%. This transition percentage becomes the fast transition range for the launch-based time period GA. Likewise, the slow transition range is determined by identifying those products whose transition percentages fall below the average transition percentage (in this example, Products D and E). The transition percentages for Products D and E are averaged and become the slow transition range for the respective launch-based time period. This process is repeated for each launch-based time period (e.g., GA+1, GA+2, etc.).

A new product associated with a fast range (e.g., Products B/C) means that the new product has a high demand as compared to the other products in the product set, or a high transition percentage in terms of volumes produced as compared to the existing products. Using the ranges applied in FIG. 3D, along with the transition percentages in FIG. 3C, it is evident that the combined Product B/C launch had a fast transition because these products consumed a high percentage of total demand during the first period of launch (i.e., Period 1). In addition, the effects of introducing Product E in Period 3 were dramatic on Product A. Product D, on the other hand, may be characterized as slow because the transition percentages are smaller than the other observed transitions. This reflects that the introduction of Product D had less of an affect on the demand for Products A, B, and C than other product launches.

Once these transition ranges have been calculated, they may be used by a planning group in pre-production efforts as a new product planning model with respect to new product introductions (e.g., Product F). The planners may apply knowledge of the products coming into the market in order to help them choose which range values to use. For example, a new product may offer very compelling functionality for the majority of the market (e.g., a product that has a performance breakthrough such that the price/performance ratio is significantly lower than existing products, and therefore, the new product is likely to transition faster than normal). The planner in this instance may use the fast range (e.g., 50% as shown in FIG. 3E) to support planning purposes. Examples of products that might prompt a slow range adoption may include new products that provide only incremental benefit, risky products that buyers may hesitate to purchase (waiting to see the product proven first), or products that will likely be costly to implement in existing environments.

As shown in FIG. 3E, the fast, average, and slow transition ranges are applied to the new product (i.e., Product F). Upon introduction of Product F at period GA, there are three choices of transition ranges that may be selected (i.e., 33% average, 50% fast, and 25% slow).

At step 212, after the transition range is selected for the new product, the new product forecast application 106 evaluates the related existing products in the product set in light of the selected transition range values and determines how to allocate the remaining demand to these existing products. The remaining portion of demand (r %) may be calculated as 1−n %=r %. If that remaining demand applies to more than one product (e.g., Products D and E), the application 106 determines how much of r % applies to each of the existing products using the new product introduction calculations for products that are still transitioning in. Alternatively, if the existing products in the product set are mature, then the application 106 may calculate the remainder based on the percentage of demand these products consumed in the prior launch-based time period. A graphical representation of the results of determining the remainder of product transition (i.e., for periods 5 and 6) using the new product planning model is shown in FIG. 3E.

At step 214, the new product forecast application 106 obtains the reliable product set forecast (e.g., total of forecast units) from the planning application 104 and allocates the demand to the new product, Product F, as well as the remaining products D and E. The planning application 104 uses input from the planners, as described above, to determine which of the three transition speeds, average, fast and slow, should be used for the new Product F and the associated old products, this is input back into the production planning application 104. A graphical depiction of a resulting demand forecast for Periods 5 and 6 is shown in FIG. 3F.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for implementing a reusable new product planning model, comprising:
   gathering historical demand data for products in a product set and determining a launch period for each of the products, the historical demand data broken down by product and for a number of consecutive time periods;
   for each of the time periods, determining a transition percentage for each of the products by calculating a percentage of total demand corresponding to each of the products at each time period;
   grouping the transition percentages of the products by respective launch-based time periods and averaging the transition percentages for each of the launch-based time periods, resulting in an averaged transition range;
   calculating a fast transition range and a slow transition range for each of the launch-based time periods by comparing the transition percentages at each of the launch-based time periods to the averaged transition range for each of the launched-based time periods; and
   developing a production plan for a new product by applying one of the fast transition range, slow transition range, and averaged transition range to the new product at a time period before product launch and allocating a remaining demand percentage to existing products in the product set using the one of the fast, slow, and averaged transition ranges applied to the new product and for a corresponding launch-based time period for the existing products, the new product and the products in the product set sharing similar characteristics.

2. The method of claim 1, wherein the developing a product plan further includes:
   applying one of the fast transition range, slow transition range, and averaged transition range to the new product for subsequent launch-based time periods; and
   allocating remaining demand percentages to existing products in the product set using the one of the fast, slow, and averaged transition ranges applied to the new product and for corresponding launch-based time periods.

3. The method of claim 1, wherein the historical demand data includes demand volumes reflecting a number of product units.

4. The method of claim 1, wherein the determining a launch period for each of the products is performed by at least one of:
   product launch date; and
   product shipping date.

5. The method of claim 1, wherein the calculating a fast transition range further includes averaging transition percentages of products that are greater than the averaged transition range for each of the launch-based time periods.

6. The method of claim 1, wherein the calculating a slow transition range further includes averaging transition percentages of products that are less than or equal to the averaged transition range for each of the launch-based time periods.

7. The method of claim 1, wherein selecting one of the fast, slow, and averaged transition ranges for the new product is based upon at least one of:
   performance data;
   price;
   risk factors;
   level of benefit provided by the new product; and
   cost of implementing the new product.

8. A computer program product for implementing a reusable new product planning model, the computer program product comprising a computer readable medium storing instructions for implementing a method, comprising:
   gathering historical demand data for products in a product set and determining a launch period for each of the products, the historical demand data broken down by product and for a number of consecutive time periods;
   for each of the time periods, determining a transition percentage for each of the products by calculating a percentage of total demand corresponding to each of the products at each time period;
   grouping the transition percentages of the products by respective launch-based time periods and averaging the transition percentages for each of the launch-based time periods, resulting in an averaged transition range;
   calculating a fast transition range and a slow transition range for each of the launch-based time periods by comparing the transition percentages at each of the launch-based time periods to the averaged transition range for each of the launched-based time periods; and
   developing a production plan for a new product by applying one of the fast transition range, slow transition range, and averaged transition range to the new product at a time period before product launch and allocating a remaining demand percentage to existing products in the product set using the one of the fast, slow, and averaged transition ranges applied to the new product and for a corresponding launch-based time period for the existing products, the new product and the products in the product set sharing similar characteristics.

9. The computer program product of claim 8, wherein the developing a product plan further includes:
  applying one of the fast transition range, slow transition range, and averaged transition range to the new product for subsequent launch-based time periods; and
  allocating remaining demand percentages to existing products in the product set using the one of the fast, slow, and averaged transition ranges applied to the new product and for corresponding launch-based time periods.

10. The computer program product of claim 8, wherein the historical demand data includes demand volumes reflecting a number of product units.

11. The computer program product of claim 8, wherein the determining a launch period for each of the products is performed by at least one of:
  product launch date; and
  product shipping date.

12. The computer program product of claim 8, wherein the calculating a fast transition range further includes averaging transition percentages of products that are greater than the averaged transition range for each of the launch-based time periods.

13. The computer program product of claim 8, wherein the calculating a slow transition range further includes averaging transition percentages of products that are less than or equal to the averaged transition range for each of the launch-based time periods.

14. The computer program product of claim 8, wherein selecting one of the fast, slow, and averaged transition ranges for the new product is based upon at least one of:
  performance data;
  price;
  risk factors;
  level of benefit provided by the new product; and
  cost of implementing the new product.

* * * * *